(12) United States Patent
Keller et al.

(10) Patent No.: US 7,857,925 B2
(45) Date of Patent: Dec. 28, 2010

(54) PROCESS DEVELOPMENT PROTOCOL AND VACUUM BAG PROCESS FOR CARBON-EPOXY PREPREG

(75) Inventors: Russell L. Keller, Maple Valley, WA (US); John F. Spalding, Renton, WA (US)

(73) Assignee: The Boeing Company, Chicago, IL (US)

( * ) Notice: Subject to any disclaimer, the term of this patent is extended or adjusted under 35 U.S.C. 154(b) by 697 days.

(21) Appl. No.: 11/764,078

(22) Filed: Jun. 15, 2007

(65) Prior Publication Data

US 2008/0308210 A1   Dec. 18, 2008

(51) Int. Cl.
*B32B 41/00* (2006.01)
(52) U.S. Cl. .............................. 156/64; 156/94; 156/98; 264/36.1; 264/36.22
(58) Field of Classification Search .................. 156/64, 156/94, 98; 29/402.09, 402.11; 264/36.1, 264/36.22
See application file for complete search history.

(56) References Cited

U.S. PATENT DOCUMENTS

| 4,357,193 | A | 11/1982 | McGann et al. |
| 5,236,646 | A | 8/1993 | Cochran et al. |
| 5,954,898 | A | 9/1999 | McKague |
| 6,761,783 | B2 | 7/2004 | Keller et al. |

FOREIGN PATENT DOCUMENTS

WO   99/26999 A   6/1999

*Primary Examiner*—George R Koch, III
(74) *Attorney, Agent, or Firm*—Felix L. Fischer (57) ABSTRACT

A protocol for determining process parameters for debulking composite laminates is established using a standardized a double vacuum debulk (DVD) process. This allows for the development of a rapid fabrication process for thick laminates of toughened carbon/epoxy composite materials. For rework, a single piece multilayer patch is made available for bonding with an adhesive layer to a prepared structural area.

29 Claims, 6 Drawing Sheets

PROCESS DEVELOPMENT PROTOCOL AND VACUUM BAG PROCESS FOR CARBON-EPOXY PREPREG

FIELD

This invention relates generally to composite structures and more particularly to a protocol for development of process parameters for vacuum bag processing of composite prepreg patches for rework or original parts manufacturing and specific application to a carbon-epoxy pre-impregnated laminate (pre-preg) system for non-autoclave processing.

BACKGROUND

Prior art procedures for certain prepreg tape materials, specifically Torayca® 3631, 350 F curing toughened carbon/epoxy prepreg, have vacuum bag process limitations that cause excessively long processing times to complete reworks with patch thicknesses greater than 12 plies when the patch is at an edge and 6 plies when the patch is not at an edge. When the required rework exceeds these ply limitations, a partial patch (of either 6 plies or 12 plies depending on the circumstance) is applied and cured, including an adhesive layer. This process is repeated until the entire patch is built up to the required number of layers. As an example, a rework patch in the center of a part requiring 54 plies must be built up 6 plies at a time in 9 separate curing operations. The primary reason for this limitation is that excessive porosity results in the patch material when plies greater than the limitations are processed at one time. The excessive porosity is undesirable. The lay-up process includes 1-minute ply debulking for every ply to minimize trapped air between plies. In addition, the cure cycle includes an intermediate 60 minute hold at 200 F to minimize porosity in the patch. Both of these provisions add significant time to the overall process.

A standard vacuum bag and curing processes used in the prior art results in a patch or laminate that may have excessive porosity levels. Typical acceptable porosity levels are less than ≦4% for reworked parts with ≦2% for original manufacturing, whereas the Toray carbon/epoxy materials exhibit porosity levels in the range of 5-10% when processed outside of the production process limitations.

Additionally, having multiple layers of adhesive imbedded into the patch may be undesirable due to the resulting porosity in the adhesive layers. This result may be problematic for rework on thick laminates as the required strengths may not be able to be obtained using the current vacuum bag processes. Unless the part can be processed in an autoclave, a thick patch of toughened carbon/epoxy composites may not be possible with prior art techniques.

Development of a patch creation and debulking tooling approach is disclosed in U.S. Pat. No. 6,761,783 entitled PROCESS METHOD TO REPAIR BISMALEIMIDE (BMI) COMPOSITE STRUCTURES having a common assignee with the present application.

It is therefore desirable to provide a protocol for establishing process times and parameters for application to a standard rework approach. It is further desirable to employ the developed protocol for specific process parameter definition for patch creation in toughened carbon/epoxy prepreg materials.

SUMMARY

The embodiments disclosed herein provide a protocol for determining process parameters for composite processing using double vacuum debulk (DVD). The protocol provides for obtaining cure and current consolidation information of a composite material system as a preliminary baseline. A determination is made if a rheology study is required and if so, the rheology study is conducted to determine resin viscosity profile upon heat up to cure temperature. The viscosity profile is evaluated for initial trials. Initial trials by fabrication of test panels simulating rework patches are then conducted with multiple variations of time/temp DVD profiles based on viscosity profile to confirm data values. Trial panels of varying thicknesses are fabricated. These panels are evaluated by conducting a Non-destructive Inspection (NDI) of at least one panel using 5 MHz through-transmission ultrasonics, assessing panel bleed during both debulk and cure, assessing general quality appearance, and determining panel average thickness to confirm patch quality. A matrix for varying time/temperature profiles is then prepared to pursue better results or find process limits and the processes of the initial trials are repeated on the matrix panels. A determination of an optimum consolidation and defining process points at which quality drops off is made and the protocol results are applied to processing for the material tested.

In a specific embodiment for rework of a toughened carbon/epoxy composite, a multilayer patch of the toughened carbon/epoxy prepreg for an inconsistent structure is assembled. A lower vacuum bag assembly is prepared by placing a layer of breather material on a thick tool and centering a heat blanket two-inches larger than the patch on the breather material. A highly conductive metal sheet of approximately the same size as the heat blanket is covered with a nonporous Polytetrafluoroethylene (PTFE) fabric material and placed on top of the heat blanket. Two same-sized pieces of porous PTFE about one inch larger than the patch material in all directions are cut and one piece is centered on the covered conductive sheet and taped in place. The patch assembly is centered on the porous PTFE and thermocouples are placed around the perimeter of the patch approximately one-half inch from the patch material edge. The second piece of porous PTFE is then centered over the patch. One ply of fiberglass is cut to extend past the patch and contact upper breather material and is centered over the patch. A piece of nonporous PTFE about one inch larger than the patch is then placed over the fiberglass cloth and the entire layup is covered with two layers of breather material. Sealant tape is applied around the perimeter of the tool and two vacuum ports are placed at one end of the tool in two corners, just inside the sealant tape. The lower vacuum bag assembly is completed by covering the entire area within the sealant tape with bagging film and sealing.

An upper vacuum bag assembly is then prepared by applying sealant tape onto the sealant tape of the lower bag film except near the vacuum ports where the sealant tape is run just inside the vacuum ports, across the corners of the lower bag. One layer of breather material is cut to fit just inside the sealant and placed on top of the lower bag. A box is placed over and onto the lower bag and covered with two layers of breather material with two vacuum ports placed on top of the box. Bagging film is cut large enough to follow the contours of the box and contact the sealant tape. The bagging film is then sealed, pleating the corners to prevent bridging. The box covered with the sealed bagging film creates an upper vacuum bag.

Connectors are installed to the vacuum ports, the vacuum source is connected to the lower bag and full vacuum is applied. A vacuum gauge and vacuum source are connected to the upper vacuum bag and vacuum is drawn slowly ensuring that the bag film follows the contour of the box to prevent excessive bridging. Full vacuum is then applied to the upper vacuum bag vacuum ports and adjusted as necessary to ensure the vacuum is equal to or slightly less than the lower bag vacuum level.

Heat is applied to the patch material at a rate and to the temperature determined in the protocol and the temperature is held for a period determined in the protocol. The patch is allowed to cool to approximately 100 degrees F. Rework is then accomplished by installation on the structure for which the patch assembly was prepared.

BRIEF DESCRIPTION OF THE DRAWINGS

These and other features and advantages of the present embodiments will be better understood by reference to the following detailed description when considered in connection with the accompanying drawings wherein.

DETAILED DESCRIPTION

For description herein, patch processing under vacuum is described as the embodiments, however, alternative embodiments with comparable physical and process descriptions apply to debulking a laminated part when processed and cured using non-autoclave techniques. The term "rework" is used herein to encompass both factory processes and in-service applications for addressing structural inconsistencies and structural improvements. Similarly, while the term "patch" is employed for embodiments disclosed herein, "doublets" or "consolidated materials" constitute comparable elements employed in alternative embodiments for factory processes and in-service applications. "Inconsistencies", as the term is used in the appropriate context throughout this disclosure, refers to the difference between one or more measured characteristics of a composite structure that has been unaffected by exposure to external factors (including thermal loads, structural loads, oxidation, lightning or electrical arcing) with the same one or more measured characteristics of a composite structure that has been affected by exposure to the external factors.

Figure 1:
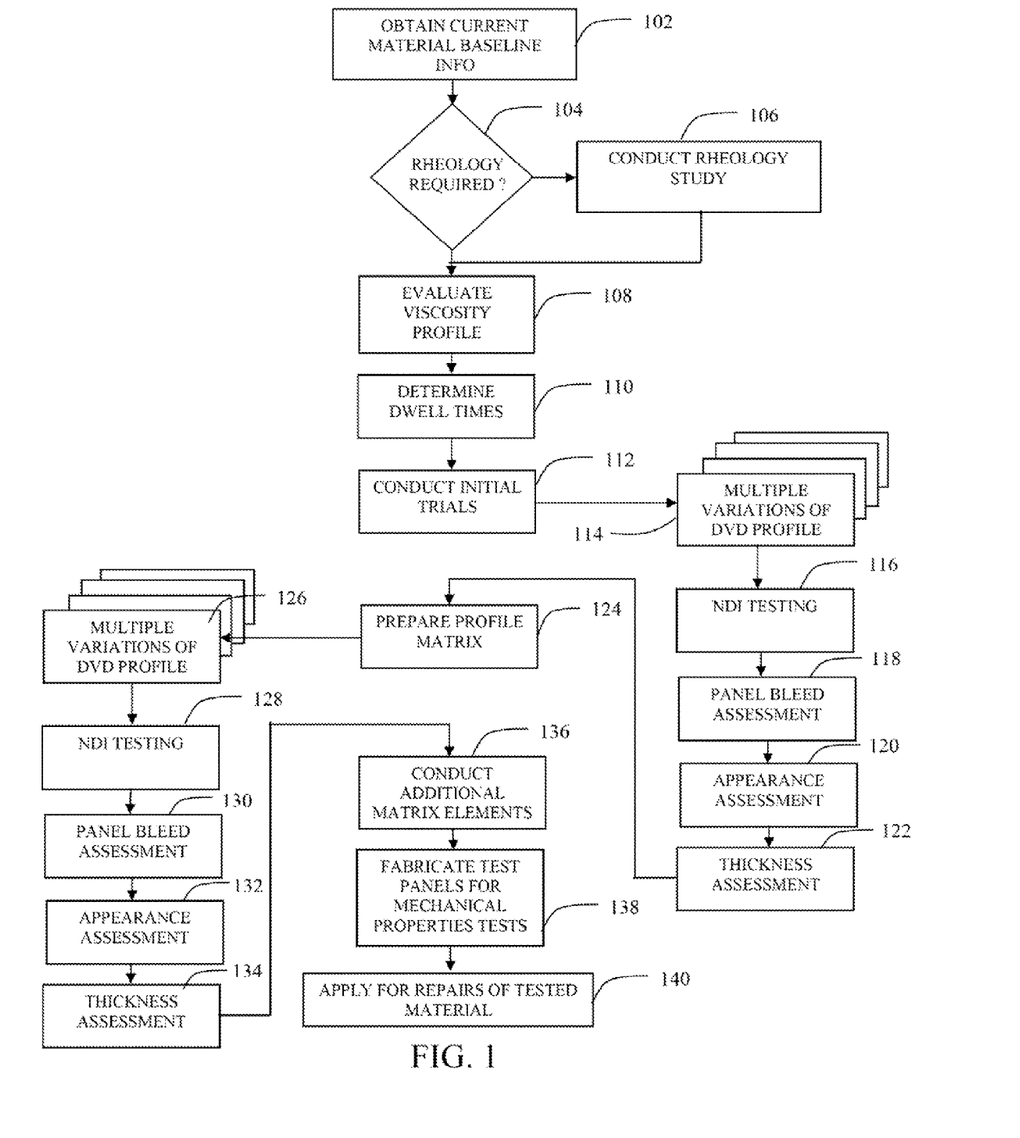
FIG. 1 is a flowchart of the process parameter definition protocol.

Establishing a protocol for determining process parameters for composite patch fabrication using a standardized approach of double vacuum debulk (DVD) creates consistent and predictable laminate characteristics. The developed process is then applied to fabrication of multilayer structures as patches for rework of inconsistent structures or for specialty fabrication of new structural elements. As shown in FIG. 1, the exemplary embodiment of the protocol provide for obtaining cure and current consolidation information of material system 102 as a preliminary baseline. Based on the information available, a determination is made if rheology study required 104. If so, the rheology study is conducted to determine resin viscosity profile upon heat up to cure temperature 106.

The viscosity profile is evaluated for initial trials in fabricating a panel using the DVD vacuum bag process including determining temperature at which resin reaches minimum viscosity 108 and assessing dwell times depending upon time at minimum viscosity through gel time 110.

With the information on the viscosity profile in hand, initial trials are conducted 112. In these trials, typical size of the specimen is 12" by 12" and typical thickness depends on current demonstrated curing ability, however, 16-plies as employed in exemplary embodiments of the protocol provides a good starting point. The actual implemented process will be described in greater detail subsequently however, for the protocol trials a 30 min single bag consolidation process is employed prior to ramp up to cure temperature using a typical bagging process. Multiple variations 114 of time/temp DVD profiles based on viscosity profile are run in the trials to confirm data values.

The trial results are evaluated with an NDI panel using 5 MHz through transmission ultrasonics 116. Panel bleed is assessed during both debulk and cure 118 and the panel is assessed for general quality appearance 120. Panel average thickness is measured 122 to confirm patch quality.

Based on the results of the initial trials, a matrix for varying time/temp profiles to pursue better results or find process limits is prepared 124. The matrix may include a complete set of panels to fabricate/evaluate based on the selected profiles. The matrix variations 126 of time/temp DVD profiles are run to confirm data values. The matrix results are evaluated with an NDI panel using 5 MHz through transmission ultrasonics 128 and panel bleed is assessed during both debulk and cure 130. The panels are assessed for general quality appearance 132. Panel average thickness is measured to confirm patch quality 134.

Other factors may need modifications, such as bagging material arrangements, vacuum levels, contouring requirements, etc. which are addressed with additional matrix elements 136 with additional testing, as required, to confirm these elements. Different panel sizes and thicknesses are also fabricated and evaluated to determine process robustness and modification requirements due to those changes.

The protocol result is a determination of optimum consolidation and defines process points at which quality drops off. Based on successful and best process, panels can be fabricated for mechanical property tests 138 to determine property improvements due to increased consolidation. The protocol results are then applied to patch fabrication for the material tested 140.

A specific exemplary embodiment of a resulting process from the development protocol is a unique ply consolidation and curing process method developed for the vacuum bag cure of Torayca® 3631, 350 F curing toughened carbon/epoxy prepreg. The development integrates several technologies to produce a quality patch fabrication process that, depending on the thickness of the patch, can dramatically reduce the time required to complete a rework compared to the prior art rework procedures. The embodiment uses the DVD bagging arrangement defined by the protocol to heat and consolidate the layers of laminate material before transferring it to the inconsistent structure or structure to be improved for final curing.

The DVD process is accomplished on panel or patch plies that have all been cut and set up for ply assembly for a rework area on a structure as defined in prior referenced U.S. Pat. No. 6,761,783 entitled PROCESS METHOD TO REPAIR BIS-MALEIMIDE (BMI) COMPOSITE STRUCTURES, the disclosure of which is incorporated herein by reference as though fully set forth. As incorporated into the procedures for the embodiments described herein there are deviations from process described in the '783 patent. In certain embodiments, plies are stacked on the part under rework and moved to the DVD station.

Figure 2A:
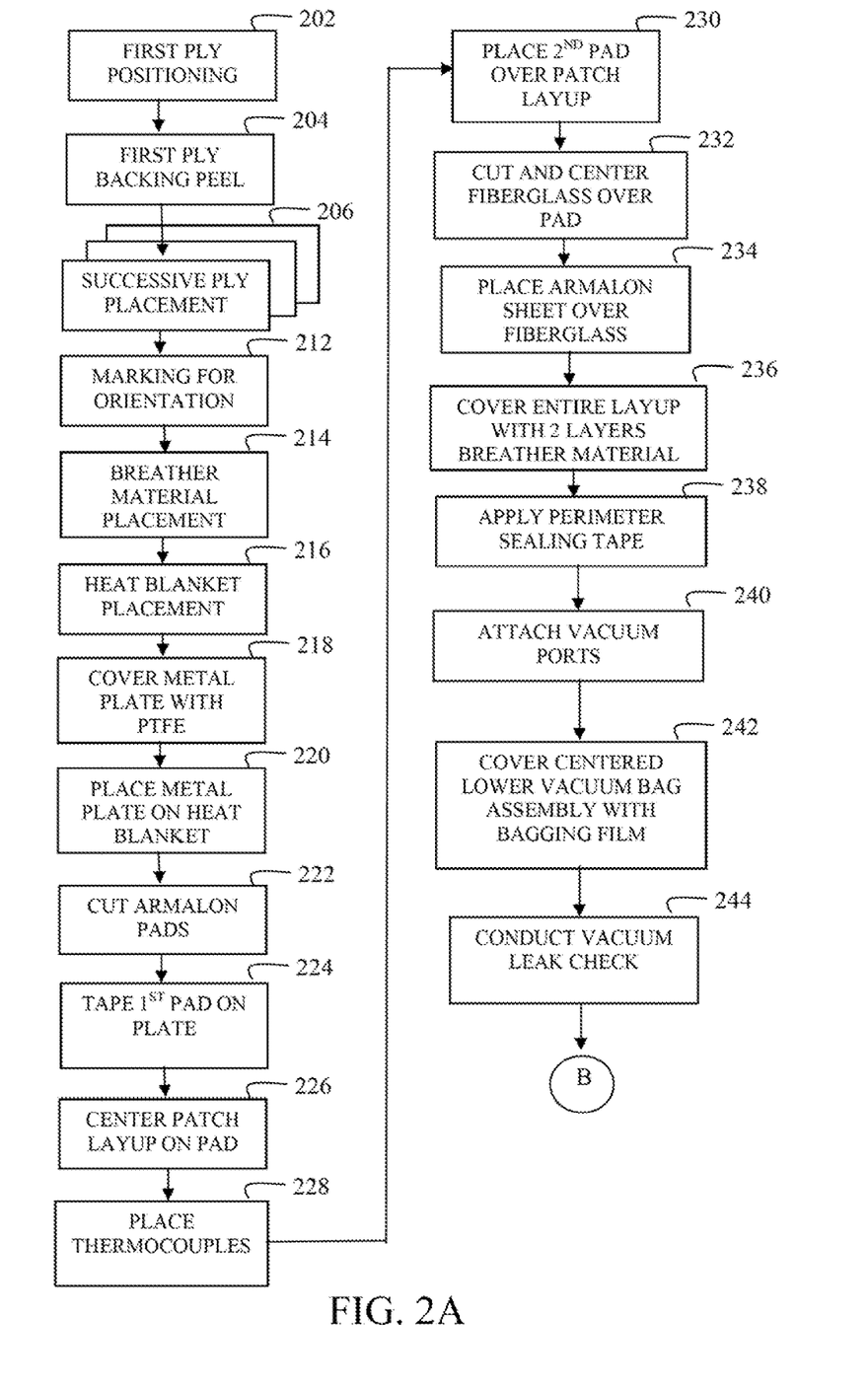
FIGS. 2A-2B provide a flow chart of preparation of a toughened carbon/epoxy prepreg patch using the developed process parameters defined in FIG. 1.
Figure 2B:
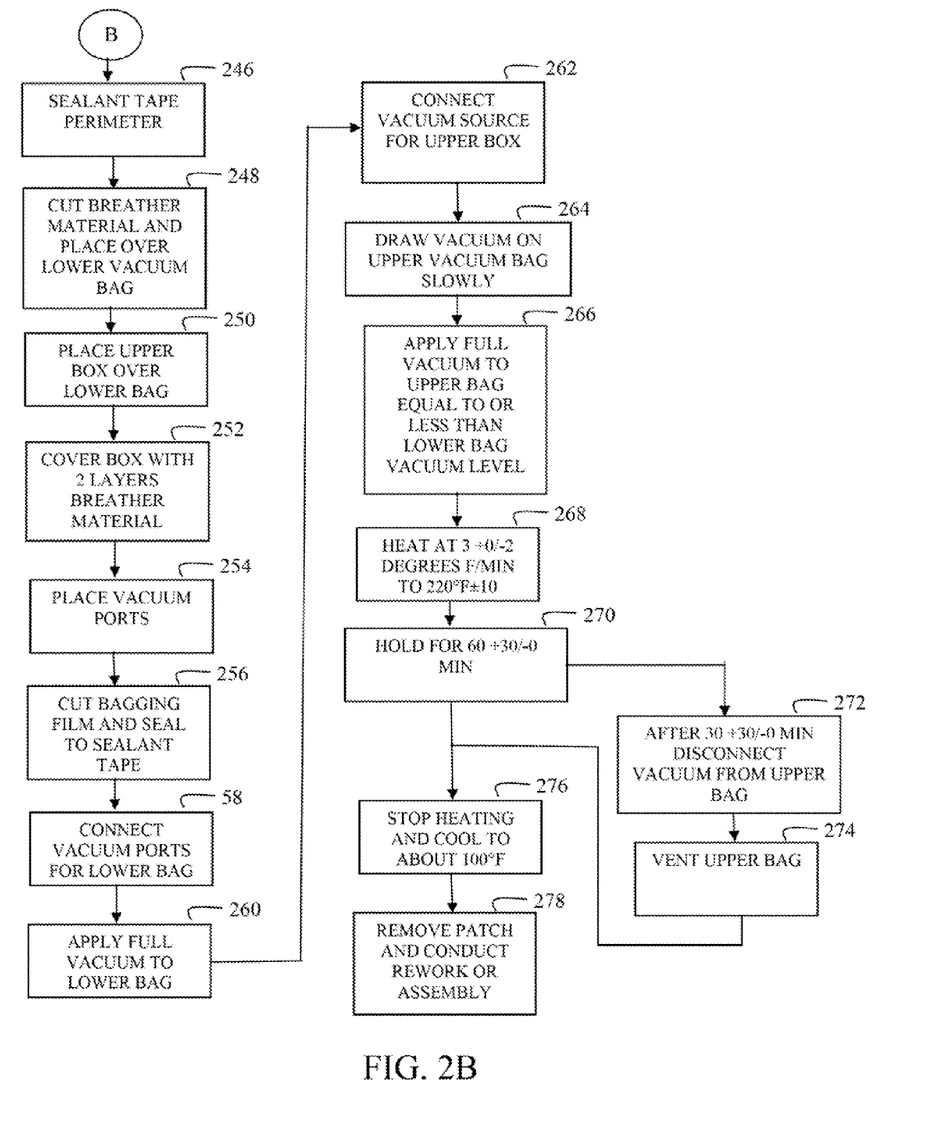
Figure 3:
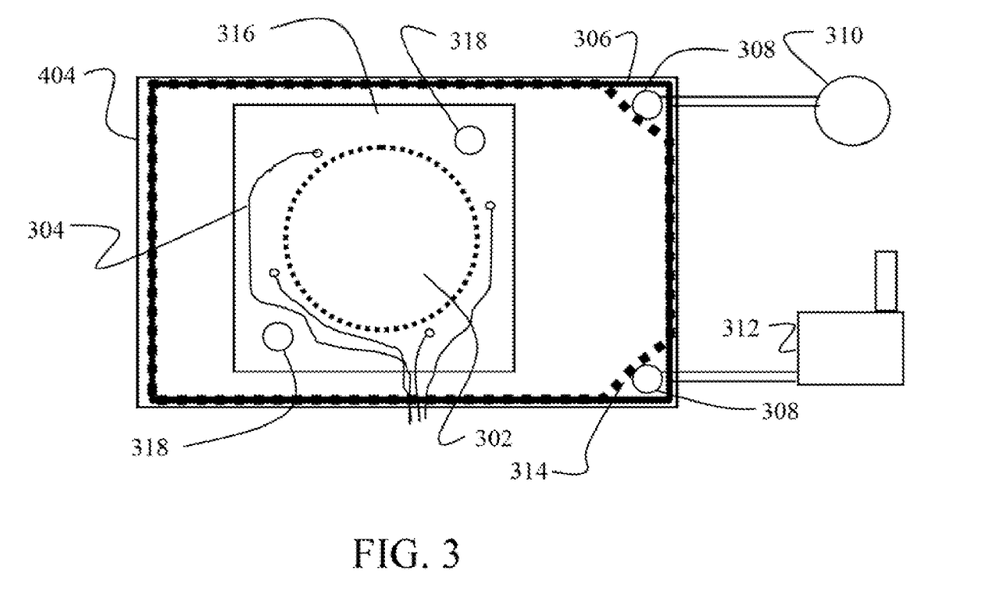
FIG. 3 is a top view of the process tooling employed for preparation of the toughened carbon/epoxy prepreg patch using the method of FIG. 2.
Figure 4:
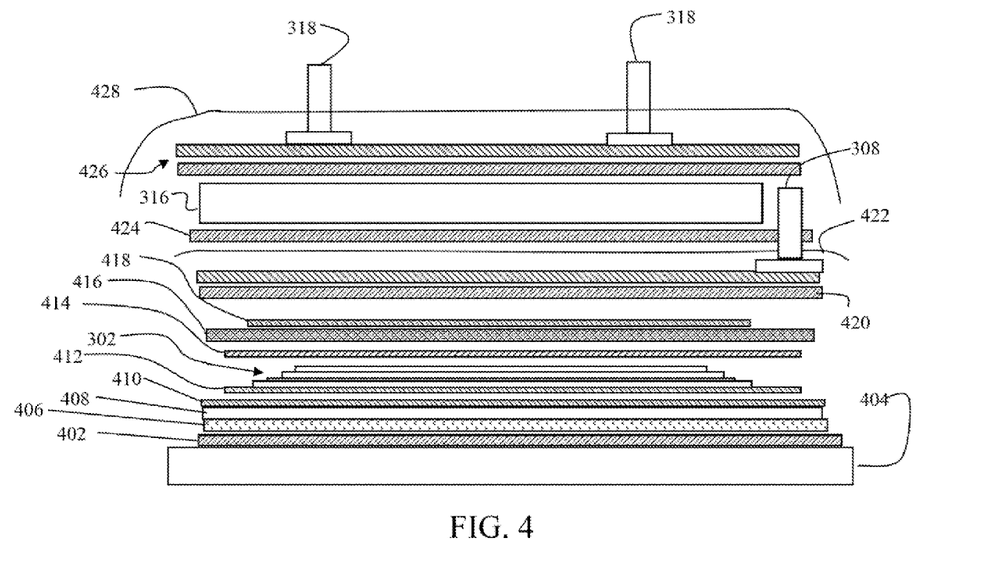
FIG. 4 is a detailed side view of the layers in the two vacuum chambers employed for preparation of the toughened carbon/epoxy prepreg patch using the method of FIG. 2.

As shown in FIGS. 2A-2B for the process steps (elements 202 et seq) and FIGS. 3 and 4 (elements 302 et seq and 402 et seq) for the physical elements, the first (smallest if used for a scarf rework as patches are assembled from the smallest ply to the largest) ply is positioned in step 202. The ply's backing material is removed in step 204. Subsequent plies are located and oriented correctly with regard to fiber direction and location tolerance with each successive ply lightly swept or rolled into place in step 206. Only a force sufficient to allow removal of the ply backing paper and prevent ply movement is applied. This process is repeated for each additional ply until all have been assembled as a patch 302. A marking pencil is used to mark orientation points around the edges of the largest patch ply in step 212. These marks are used later to accurately position the patch onto the rework area.

A lower vacuum bag assembly is prepared by placing in step 214 a layer of breather material 402 on a thick plate or tool 404 large enough for the entire double vacuum debulk assembly (lower and upper assemblies as shown in FIGS. 3 and 4). A heat blanket 406 is centered to extend a minimum of 2" past the patch material edges on the breather material in step 216. A highly conductive metal sheet such as 0.020" thick copper or 0.032" aluminum sheet 408 approximately the same size as the heat blanket is covered with 3-mil nonporous Polytetrafluoroethylene PTFE fabric material 410 such as Armalon® or solid Fluorinated Ethylene Propylene FEP in step 218 and placed on top of the heat blanket in step 220.

Two same-sized pieces of 1-mil porous PTFE fabric material are cut one inch larger than the patch material in all directions in step 222. One piece of the porous PTFE fabric material 412 is centered on the covered copper sheet and taped in place in step 224. The patch assembly 302 to be debulked is centered onto the porous PTFE fabric material in step 226. If a scarf rework patch is being debulked, the patch assembly is inverted so that the largest ply is on the bottom. Four thermocouples 304 are placed around the perimeter of the patch approximately one-half inch from the patch material edge in step 228. The second piece of porous PTFE fabric material 414 is centered over the patch in step 230.

One ply of 120-style or 220-style fiberglass cloth 416 is cut large enough to extend past the patch and contact upper breathers and centered over the patch in step 232. A piece of 3-mil nonporous PTFE fabric material or solid FEP 418 one inch larger than the patch is placed over the fiberglass cloth in step 234. The entire layup is then covered in step 236 with two layers of breather material 420. Sealant tape 306 is applied around the perimeter of the tool in step 238 and two vacuum ports 308 are placed at one end of the tool in two corners, just inside the sealant tape in step 240.

The entire lower vacuum bag assembly is covered with bagging film 422 and sealed in step 242. A vacuum gauge 310 is connected to one port and the vacuum source 312 to the other port, vacuum applied and a leak check performed in step 244. Any leaks are sealed and vacuum is removed.

In certain embodiments, the lower vacuum bag assembly is then inserted in a vacuum chamber to provide a second vacuum assembly which is then operated to function as described subsequently for the upper vacuum assembly.

In the exemplary embodiment shown in the drawings, an upper vacuum assembly is created by first applying sealant tape 314 onto the lower bag film directly above the sealant tape on the lower bag except near the vacuum ports where the sealant tape is run just inside the vacuum ports, across the corners of the lower bag in step 246. One layer of breather material 424 is cut to fit just inside the sealant and placed on top of lower bag in step 248. This layer acts as padding for the box described below and additional insulation for the material being debulked. A box 316 is placed over and onto the lower bag in step 250, ensuring that the box is not resting on top of any portion of the material being debulked. The box is covered in step 252 with two layers of breather material 426 and two vacuum ports 318 are placed on top in step 254. Bagging film 428 is cut large enough to follow the contours of the box and contact the sealant tape and the bag is sealed, pleating the corners to prevent bridging in step 256. Connectors are then installed to the vacuum ports in step 258.

To commence the debulking process, the vacuum source is reconnected to the lower bag and full vacuum (minimum of 26" Hg at STP conditions) is applied in step 260. A vacuum gauge and vacuum source are connected to the box in step 262. Vacuum is slowly drawn in step 264, ensuring that the bag film follows the contour of the box to prevent excessive bridging. If the bag film is bridging at the base, vacuum is removed and the bagging film repositioned as required.

Full vacuum is then applied to the box vacuum ports and adjusted as necessary to ensure the vacuum is equal to or slightly less (tolerance of +0/−1" Hg) than the lower bag vacuum level in step 266. No more than 1-inch absolute pressure should be on the patch material in order to allow the debulk process to work.

For the exemplary embodiment, based on tolerances defined in the process determination protocol previously described which established a processing window applicable to flat laminates/rework patches (includes scarfed patches) of 48 plies or less, and no larger than 16 inches in length, heat is applied to the patch material at a rate of 3 +0/−2 degrees F. per minute to the debulk temperature of 220±10 degrees F. in step 268. The debulk temperature is held for 60 +30/−0 minutes in step 270. After 30 +30/−0 minutes of the 60 minute hold at the debulk temperature, the vacuum hose is disconnected from the upper vacuum assembly in step 272, and the upper vacuum bag is then vented in step 274. The box may be removed when the vacuum is vented as long as the lower vacuum bag is not disturbed. After the hold at the debulk temperature is complete, the heating is stopped and the patch is allowed to cool to approximately 100 degrees F. in step 276. No cool down rate control is required. The patch preparation is then complete to conduct rework installation in step 278 on the structure as defined in U.S. Pat. No. 6,761,783.

FIGS. 3 and 4 show the physical elements of the upper and lower assemblies described in the process above. The structural box used in the double vacuum debulk process may be made in an exemplary embodiment from two pieces of 0.75" plywood bonded together for the top and 2×4's for the side walls, for a 42"×42" maximum box coverage area. Irrespective of material, the box should be approximately 6" high and at least 2" larger in all directions than the heat blanket used for the debulking process. The size and composition of the DVD box is entirely dependent on the size of the laminate being processed. Highly contoured parts require boxes that are much taller than those used for flat panels. The box should be 2" larger than the laminate in L×W and at least 2" taller than the tool when a contoured tool is being used. The height must also take into account deflection of the box when under full vacuum. The side panels should have 0.5" holes drilled to allow evacuation from the box and an opening on one side large enough for the heat blanket cord and TC wires to pass through. Sharp edges on the box should be rounded over and smoothed with abrasive paper so the vacuum bag will not be punctured.

For the embodiment disclosed, all of the patch plies can be stacked and consolidated at one time saving a substantial amount of process time; no ply-by-ply debulking process is required to consolidate the patch plies and the consolidated rework patch is transferred to the rework area all at one time. Generally, one layer of adhesive is required to bond the patch to the scarfed out rework area. The rework process eliminates the need to debulk each ply during patch build-up significantly reducing rework time, depending upon the number of plies required in the patch.

With this method, very thick rework patches can be consolidated, bonded, and cured at one time and uses only one adhesive interface layer. This provides capability for very thick laminates not currently available as well as saving a substantial amount of processing time. Current data has shown the process of the exemplary embodiment is application for up to 96 plies. Porous-free rework patches are created, enabling the rework to exhibit sufficient stiffness and strength to restore the inconsistent structure's structural integrity and ultimate strength requirements.

For applications with aircraft structural implementation of composites, the exemplary embodiment of the rework process can be used to restore inconsistent structure in all maintenance environments, including factory, in-service, as well as major rework activity carried out by Airplane-on-Ground (AOG), Maintenance Repair Organizations (MROs), and depot activity.

Figure 5:
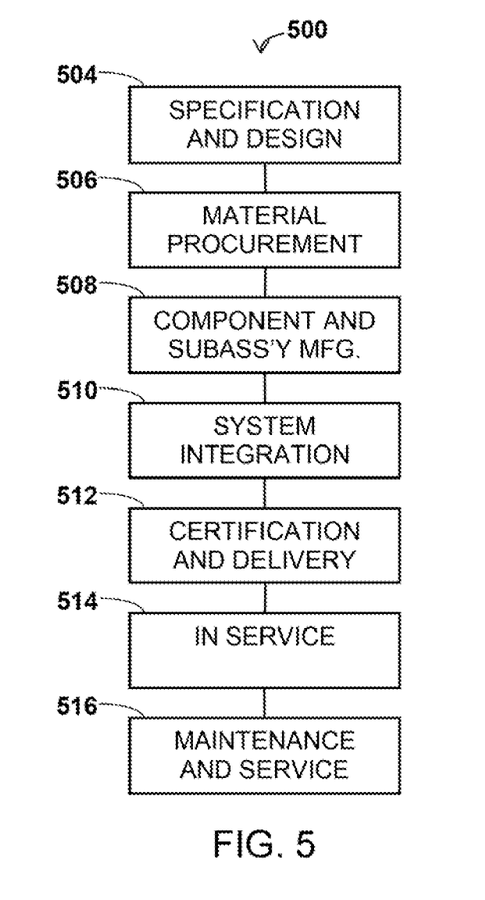
FIG. 5 is a flow diagram of aircraft production and service methodology.
Figure 6:
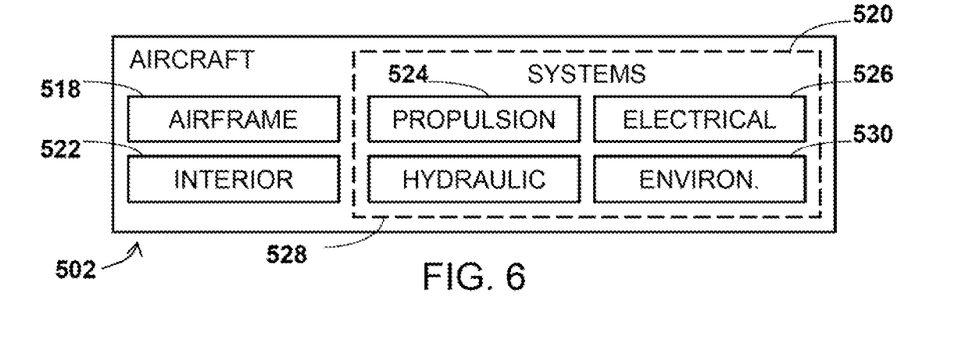
FIG. 6 is a block diagram of an aircraft.

Referring FIGS. 5 and 6, embodiments of the disclosure may be described in the context of an aircraft manufacturing and service method 500 as shown in FIG. 5 and an aircraft 502 as shown in FIG. 6. During pre-production, exemplary method 500 may include specification and design 504 of the aircraft 502 and material procurement 506. During production, component and subassembly manufacturing 508 and system integration 510 of the aircraft 502 takes place. Thereafter, the aircraft 502 may go through certification and delivery 512 in order to be placed in service 514. While in service by a customer, the aircraft 502 is scheduled for routine maintenance and service 516 (which may include modification, reconfiguration, refurbishment and so on).

Each of the processes of method 500 may be performed or carried out by a system integrator, a third party, and/or an operator (e.g., a customer), as indicated by the "X" in the grid to the right of the flow diagram of FIG. 5. For the purposes of this description, a system integrator may include without limitation any number of aircraft manufacturers and major-system, subcontractors; a third party may include without limitation any number of venders, subcontractors, and suppliers; and an operator may be an airline, leasing company, military entity, service organization, and so on.

As shown in FIG. 6, the aircraft 502 produced by exemplary method 500 may include an airframe 518 with a plurality of systems 520 and an interior 522. Examples of high-level systems 520 include one or more of a propulsion system 524, an electrical system 526, a hydraulic system 526, and an environmental system 530.

Apparatus and methods embodied herein may be employed during any one or more of the stages of the production and service method 500. For example, components or subassemblies corresponding to production process 508 may be fabricated or manufactured in a manner similar to components or subassemblies produced while the aircraft 502 is in service. Also, one or more apparatus embodiments, method embodiments, or a combination thereof may be utilized during the production stages 508 and 510, for example, by substantially expediting assembly of or reducing the cost of an aircraft 502. Similarly, one or more of apparatus embodiments, method embodiments, or a combination thereof may be utilized while the aircraft 502 is in service, for example and without limitation, to maintenance and service 516.

Having now described exemplary embodiments in detail as required by the patent statutes, those skilled in the art will recognize modifications and substitutions to the specific embodiments disclosed herein. Such modifications are within the scope and intent of the present invention as defined in the following claims.

What is claimed is:

1. A protocol for determining process parameters for composite patch preparation using double vacuum debulk (DVD) comprising the steps of:
   obtaining cure and current consolidation information of a composite material system as a preliminary baseline;
   determining if a rheology study is required;
   if so, conducting the rheology to determine resin viscosity profile upon heat up to cure temperature;
      evaluating the viscosity profile for initial trials;
      conducting initial trials on a plurality of panels with multiple variations of time/temp DVD profiles based on viscosity profile to confirm data values;
      evaluating trial results on at least one panel with a non-destructive inspection using 5 MHz through transmission ultrasonics;
      assessing panel bleed during both debulk and cure;
      assessing general quality appearance;
      measuring panel average thickness to confirm patch quality;
   preparing a matrix for varying time/temp profiles to pursue better results or find process limits;
   running the matrix variations of time/temp DVD profiles to confirm data values;
   assessing panel bleed for matrix variations during both debulk and cure assessing matrix panels for general quality appearance;
   measuring matrix panel average thickness to confirm patch quality;
   evaluating matrix panels with an NDI panel using 5 MHz through transmission ultrasonics;
   determining an optimum consolidation and defining process points at which quality drops off; and,
   applying protocol results to patch preparation for the material tested.

2. The protocol defined in claim 1 after the step of evaluating the viscosity profile further comprising the steps of;
   fabricating a panel using the DVD vacuum bag process;
   determining temperature at which resin reaches minimum viscosity; and
   assessing dwell times depending upon time at minimum viscosity through gel time.

3. The protocol defined in claim 1 wherein for initial trials are conducted on panels of about 12" by 12" and typical thickness and 16-plies with a 30 min single bag consolidation process employed prior to ramp up to cure temperature using a typical bagging process.

4. The protocol defined in claim 1 wherein the matrix includes a complete set of panels to evaluate selected profiles.

5. The protocol defined in claim 1 wherein the matrix variations include bagging material arrangements and vacuum levels are addressed with additional matrix elements with additional testing, as required, to confirm these elements.

6. The protocol as defined in claim 1 wherein the matrix variations further include different panel sizes and thicknesses to determine process robustness and modification requirements.

7. The protocol as defined in claim 1 wherein fully representative panels are fabricated for mechanical property tests to determine property improvements due to increased consolidation.

8. A process for toughened carbon/epoxy composites comprising the steps of:
    determining process parameters for composite patch lamination using double vacuum debulk (DVD) comprising the steps of:
    obtaining cure and current consolidation information of a composite material system as a preliminary baseline;
    determining if a rheology study is required;
    if so, conducting the rheology to determine resin viscosity profile upon heat up to cure temperature;
    evaluating the viscosity profile for initial trials;
    conducting initial trials with multiple variations of time/temp DVD profiles based on viscosity profile to confirm data values;
    evaluating trial results with an NDI panel using 5 MHz through transmission ultrasonics;
    assessing panel bleed during both debulk and cure;
    assessing general quality appearance;
    measuring panel average to confirm patch quality;
    preparing a matrix for varying time/temp profiles to pursue better results or find process limits;
    running the matrix variations of time/temp DVD profiles to confirm data values;
    assessing panel bleed for matrix variations during both debulk and cure assessing matrix panels for general quality appearance;
    measuring matrix panel average thickness to confirm patch quality;
    evaluating matrix panels with an NDI panel using 5 MHz through transmission ultrasonics;
    determining an optimum consolidation and defining process points at which quality drops off;
    preparing a multilayer patch assembly of the toughed carbon/epoxy prepreg for insertion in a structure;
    preparing a lower vacuum bag assembly by
    placing a layer of breather material on a thick plate;
    centering a heat blanket sized as determined in the matrix variations on the breather material;
    covering a high conductivity metal sheet approximately the same size as the heat blanket with a nonporous Polytetrafluoroethylene PTFE fabric material;
    placing the plate on top of the heat blanket;
    cutting two same-sized pieces of PTFE about one inch larger than the patch material in all directions;
    centering one piece on the covered conductive sheet and taping it in place;
    centering the patch assembly onto the porous PTFE;
    placing thermocouples around the perimeter of the patch approximately one-half inch from the patch material edge;
    centering the second piece of porous PTFE over the patch;
    cutting one ply of fiberglass to extend past the patch and contact upper breathers and centering over the patch;
    placing a piece of nonporous PTFE about one inch larger than the patch over the fiberglass cloth;
    covering the entire layup with two layers of breather material;
    applying sealant tape around the perimeter of the tool and placing two vacuum ports at one end of the tool in two corners, just inside the sealant tape;
    covering the entire lower vacuum bag assembly bagging film and sealing;
    providing a second vacuum assembly enclosing the lower vacuum bag assembly;
    connecting the vacuum source to the lower bag and applying full vacuum;
    applying full vacuum to the second vacuum assembly and adjusting as necessary to ensure the vacuum is equal to or slightly less than the lower bag vacuum level;
    applying heat to the patch material at a rate and to the temperature determined in the protocol;
    holding the temperature for a period determined in the protocol;
    allowing the patch to cool to approximately 100 degrees F.;
    conducting rework installation on the structure for which the patch assembly was prepared.

9. The method as defined in claim 8 wherein the toughened carbon/epoxy composite is 350 F curing toughened carbon/epoxy prepreg and the process determination by the protocol for flat laminates/rework patches (includes scarfed patches) of 48 plies or less, and no larger than 16 inches in length provides for heating the patch material at a rate of 3 +0/−2 degrees F. per minute to the debulk temperature of 220±10 degrees F.;
    holding the debulk temperature for 60 +30/−0 minutes;
    after 30 +30/−0 minutes of the 60 minute hold at the debulk temperature, disconnecting the vacuum hose from the upper chamber and venting the upper vacuum bag;
    after the hold at the debulk temperature is complete, stopping the heating and allowing the patch to cool to approximately 100 degrees F.

10. The method as defined in claim 8 wherein the heating blanket extends a minimum of 2" past the patch material edges.

11. The method as defined in claim 8 wherein the high conductivity sheet comprises a 0.020" thick copper.

12. The method as defined in claim 8 wherein the high conductivity sheet comprises 0.032" aluminum.

13. The method defined in claim 8 wherein the structure in which the patch is inserted is inconsistent and the patch process is for rework.

14. The method defined in claim 8 wherein the step of providing a second vacuum assembly comprises the steps of:
    preparing an upper vacuum assembly by
    applying sealant tape onto the lower bag film directly above the sealant tape on the lower bag except near the vacuum ports where the sealant tape is run just inside the vacuum ports, across the corners of the lower bag;
    cutting one layer of breather material to fit just inside the sealant and placing it on top of lower bag;
    placing a box over and onto the lower bag;
    covering the box with two layers of breather material and placing two vacuum ports on top;
    cutting bagging film large enough to follow the contours of the box and contact the sealant tape;
    sealing and the bag, pleating the corners to prevent bridging;
    installing connectors to the vacuum ports.

15. The method of claim 14 in which prior to the step of apply full vacuum to the second vacuum assembly the following steps are performed:
    connecting a vacuum gauge and vacuum source to the box;
    drawing vacuum slowly ensuring that the bag film follows the contour of the box to prevent excessive bridging.

16. A method for preparation of patches for an aircraft structure employing 350 F curing toughened carbon/epoxy composites comprising the steps of:
   preparing a multilayer patch assembly of the toughed carbon/epoxy prepreg;
   preparing a lower vacuum bag assembly by
   placing a layer of breather material on a thick plate;
   centering a heat blanket sized as determined in the matrix variations on the breather material;
   covering a high conductivity metal sheet approximately the same size as the heat blanket with a nonporous Polytetrafluoroethylene PTFE fabric material;
   placing the plate on top of the heat blanket;
   cutting two same-sized pieces of PTFE about one inch larger than the patch material in all directions;
   centering one piece on the covered conductive sheet and taping it in place;
   centering the patch assembly onto the porous PTFE;
   placing thermocouples around the perimeter of the patch approximately one-half inch from the patch material edge;
   centering the second piece of porous PTFE over the patch;
   cutting one ply of fiberglass to extend past the patch and contact upper breathers and centering over the patch;
   placing a piece of nonporous PTFE about one inch larger than the patch over the fiberglass cloth;
   covering the entire layup with two layers of breather material;
   applying sealant tape around the perimeter of the tool and placing two vacuum ports at one end of the tool in two corners, just inside the sealant tape;
   covering the entire lower vacuum bag assembly bagging film and sealing;
   preparing an upper vacuum assembly by
   applying sealant tape onto the lower bag film directly above the sealant tape on the lower bag except near the vacuum ports where the sealant tape is run just inside the vacuum ports, across the corners of the lower bag;
   cutting one layer of breather material to fit just inside the sealant and placing it on top of lower bag;
   placing a box over and onto the lower bag;
   covering the box with two layers of breather material and placing two vacuum ports on top;
   cutting bagging film large enough to follow the contours of the box and contact the sealant tape;
   sealing and the bag pleating the corners to prevent bridging;
   installing connectors to the vacuum ports;
   connecting the vacuum source to the lower bag and applying full vacuum;
   connecting a vacuum gauge and vacuum source to the box;
   drawing vacuum slowly ensuring that the bag film follows the contour of the box to prevent excessive bridging;
   applying full vacuum to the upper bag vacuum ports and adjusted as necessary to ensure the vacuum is equal to or slightly less than the lower bag vacuum level;
   heating the patch material at a rate of 3 +0/−2 degrees F. per minute to the debulk temperature of 220±10 degrees F.;
   holding the debulk temperature for 60 +30/−0 minutes;
   allowing the patch is allowed to cool to approximately 100 degrees F.;
   conducting installation on the structure for which the patch assembly was prepared.

17. The method of claim 16 in which the patch is installed as a rework for inconsistencies on the structure for which the patch was prepared and further comprises the initial steps of preparing the structure for a patch.

18. The method of claim 17 in which the patch is a scarfed patch and the step of centering the patch assembly further comprising the step of:
   inverting the patch assembly so that the largest ply is on the bottom.

19. A protocol for determining process parameters for composite material preparation for a repair patch using double vacuum debulk (DVD) comprising the steps of:
   obtaining cure and current consolidation information of a composite material system as a preliminary baseline;
   preparing a matrix for varying time/temp profiles to pursue better results or find process limits;
   running the matrix variations of time/temp DVD profiles to confirm data values;
   assessing results for the matrix variations;
   determining an optimum consolidation and defining process points at which quality drops off; and,
   applying protocol results to patch preparation for the material tested.

20. The protocol defined in claim 19 further comprising
   conducting initial trials on a plurality of panels with multiple variations of time/temp DVD profiles based on viscosity profile to confirm data values;
   evaluating trial results on the initial trial panels.

21. The protocol defined in claim 20 further comprising
   determining if a rheology study is required;
   if so, conducting the rheology to determine resin viscosity profile upon heat up to cure temperature; and
   evaluating the viscosity profile for initial trials.

22. The protocol defined in claim 20 wherein the step of evaluating trial results on the initial trial panels comprises:
   evaluating at least one panel with a non-destructive inspection using 5 MHz through transmission ultrasonics;
   assessing panel bleed during both debulk and cure;
   assessing general quality appearance; and
   measuring panel average thickness to confirm patch quality.

23. The protocol defined in claim 19 wherein the step of assessing the results of the matrix variations comprises:
   assessing panel bleed for the matrix variations during both debulk and cure assessing matrix panels for general quality appearance;
   measuring matrix panel average thickness to confirm patch quality;
   evaluating matrix panels with an NDI panel using 5 MHz through transmission ultrasonics.

24. The protocol defined in claim 21 after the step of evaluating the viscosity profile further comprising the steps of;
   fabricating a panel using the DVD vacuum bag process;
   determining temperature at which resin reaches minimum viscosity; and
   assessing dwell times depending upon time at minimum viscosity through gel time.

25. The protocol defined in claim 20 wherein for initial trials are conducted on panels of about 12" by 12" and typical thickness and 16-plies with a 30 min single bag consolidation process employed prior to ramp up to cure temperature using a typical bagging process.

26. The protocol defined in claim 19 wherein the matrix includes a complete set of panels to evaluate selected profiles.

27. The protocol defined in claim 19 wherein the matrix variations include bagging material arrangements and vacuum levels are addressed with additional matrix elements with additional testing, as required, to confirm these elements.

28. The protocol as defined in claim 19 wherein the matrix variations further include different panel sizes and thicknesses to determine process robustness and modification requirements.

29. The protocol as defined in claim 19 further comprising fabricating representative panels for mechanical property tests to determine property improvements due to increased consolidation.

* * * * *